Aug. 14, 1923.
A. COMO
1,464,808
OPERATING MECHANISM FOR HARVESTERS
Filed Nov. 1, 1920 4 Sheets-Sheet 4
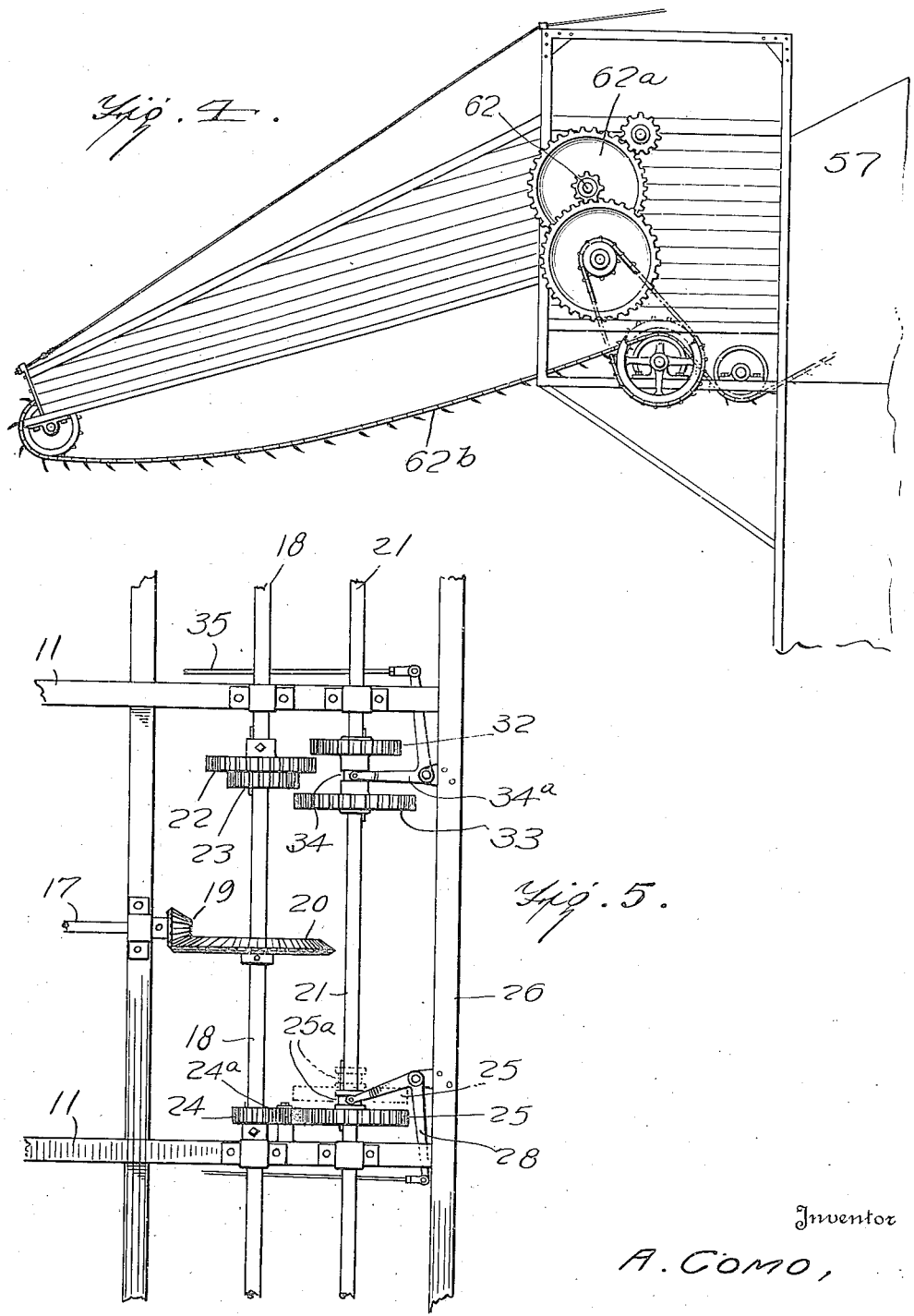
Inventor
A. Como,
By Watson E. Coleman
Attorney Patented Aug. 14, 1923.

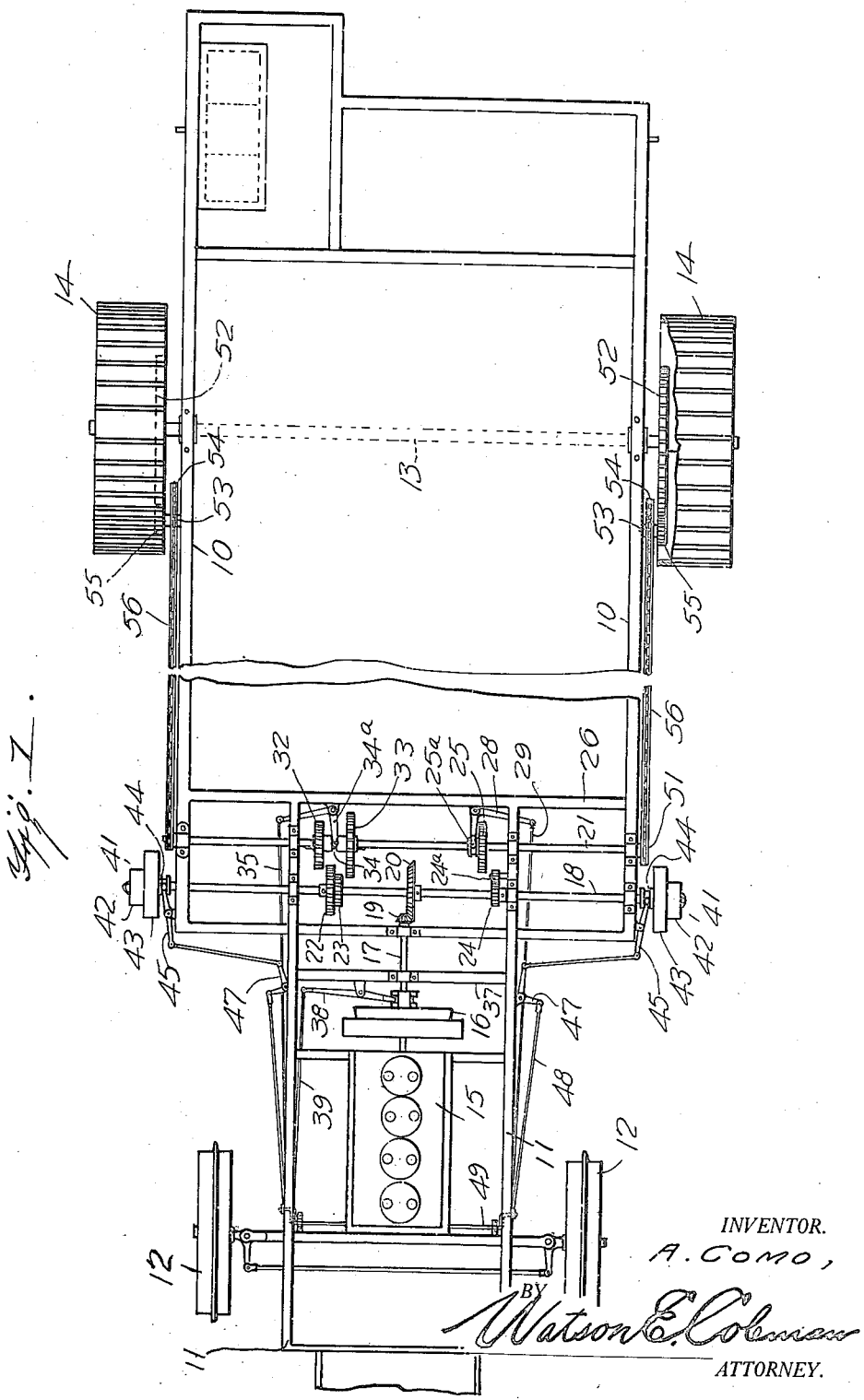

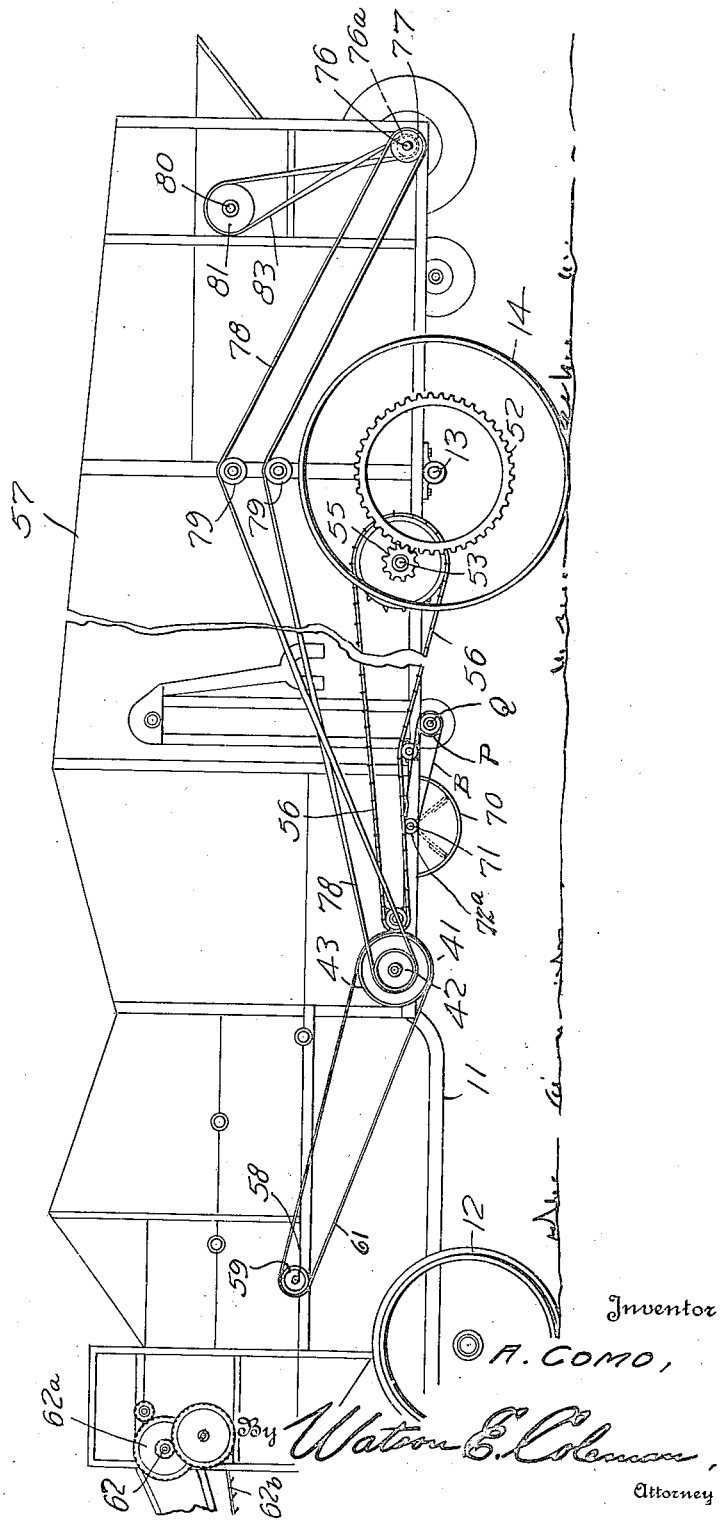

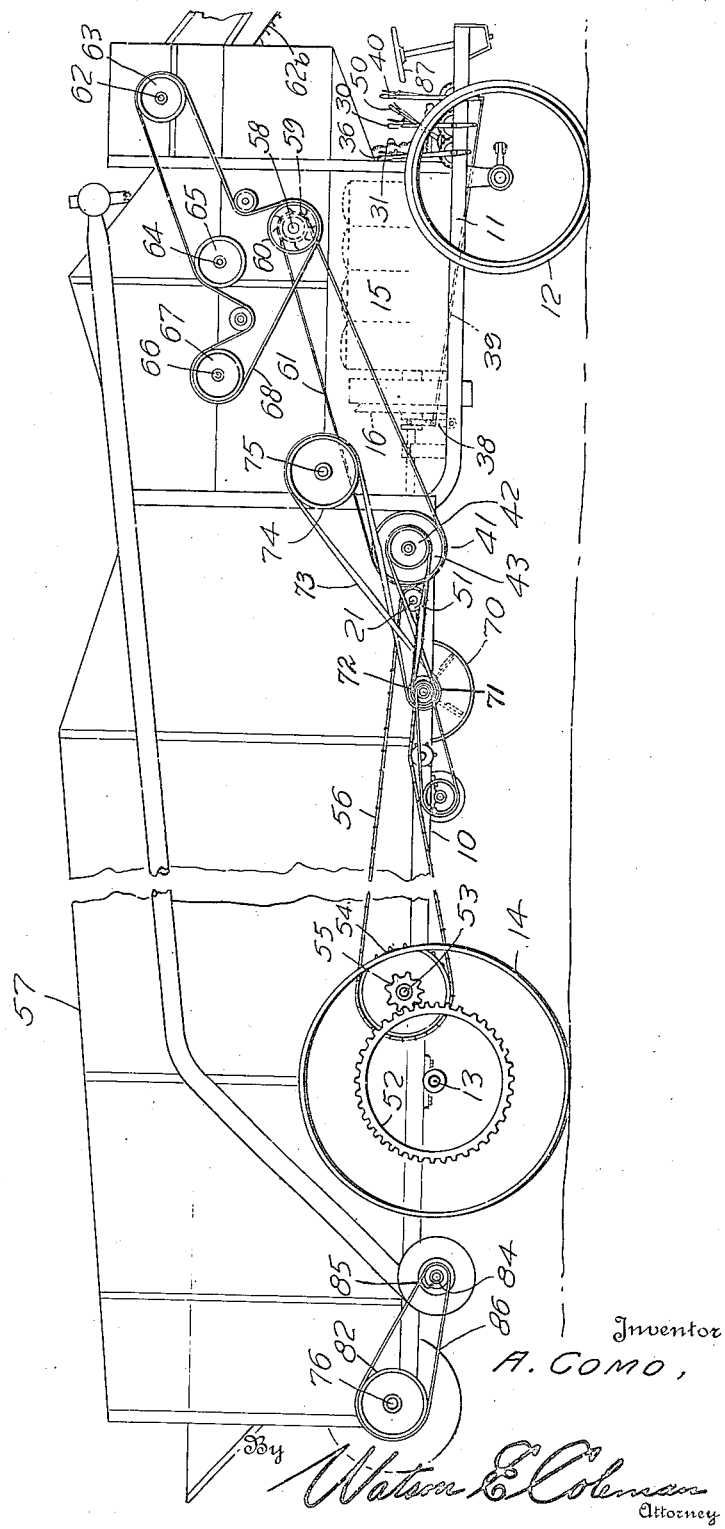

1,464,808

UNITED STATES PATENT OFFICE.

ALMA COMO, OF EDGERLY, LOUISIANA.

OPERATING MECHANISM FOR HARVESTERS.

Application filed November 1, 1920. Serial No. 421,101.

*To all whom it may concern:*

Be it known that I, ALMA COMO, a citizen of the United States, residing at Edgerly, in the parish of Calcasieu and State of Louisiana, have invented certain new and useful Improvements in Operating Mechanism for Harvesters, of which the following is a specification, reference being had to the accompanying drawings.

This invention relates to operating mechanism for harvesters.

An important object of the invention is to provide means whereby a threshing machine may be operated by a unitary power plant which may be connected to shift the thresher from point to point as desired or which may be connected to drive the threshing mechanism or the threshing machine or which may be connected to drive both simultaneously, if so desired, as for example when the stacked straw, which is generally delivered at the rear end of the machine has become piled to such an extent as to necessitate forward shifting of the thresher. This construction enables shifting of the machine without in any manner interfering with the threshing operation.

A further object of the invention is to provide a drive of the above character having the controls thereof conveniently positioned adjacent the driver's seat, thereby permitting the driving of the machine and the complete governing of the threshing operation at the same time by one man.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

Figure 1 is a plan view of the frame of a threshing machine constructed in accordance with the invention and provided with my improved operating mechanism.

Figure 2 is a side elevation of the left hand side of a threshing machine embodying the operating mechanism.

Figure 3 is a side elevation of the right hand side thereof.

Figure 4 is a side elevation showing the gearing employed for operating the bundle loader, and Figure 5 is an entire plan view showing the change speed gearing employed in driving the threshing machine.

Referring now more particularly to the drawings, the numeral 10 indicates a main body frame having extending from the forward end thereof an auxiliary power frame 11, which is secured to the main frame approximately centrally thereof. The forward end of the frame 11 is supported by combined steering and supporting wheels 12. The frame 10 is provided adjacent its rear end with a supporting axle 13 upon which are rotatably mounted supporting and driving wheels 14.

Mounted within the frame 11 is a power plant 15 adapted to be connected by the clutch 16 with a power shaft 17. Rotatably mounted transversely of the frame 10 at the forward end thereof and in journals carried thereby is a shaft 18. The shaft 17 is provided upon its rearward end with a pinion 19 which engages a gear 20 secured to the transverse shaft 18. The shaft 18 has mounted thereon to one side of the gear 20, a compound gear embodying a large gear 22 and a relatively small gear 23, these gears being secured to the shaft 18. Secured to the shaft 18 upon the opposite side of the gear 20 is a gear 24 which meshes with the idler gear $24^a$ rotatably mounted upon the rear end of the frame 11.

Rotatably mounted in the frame 10 immediately to the rear of the shaft 18 is a second transverse shaft 21 having slidably mounted thereon a gear 25 embodying a hub provided with a groove $25^a$. The rear ends of the side members of the frame 11 are connected to one another and to the frame 10 by a transverse bar 26. A bell crank lever 28 is pivotally mounted upon the bar 26 and has one arm thereof provided with a fork engaging the groove $25^a$ of the gear 25. The opposite arm of the lever 28 is operatively connected by means of a link 29 with a hand lever 30 arranged adjacent the driver's seat 31. Operation of the lever 30 will cause the gear 25 to be shifted longitudinally upon the shaft to engage or disengage the pinion $24^a$. As the gear 25 is held against rotation with relation to the shaft 21 when the shaft 19 is rotated and the gear 25 is in engagement with the gear $24^a$, the shaft 21 will be rotated in the opposite direction when the gear 25 and pinion $24^a$ are engaged.

Slidably mounted upon the shaft 21 adjacent the gears 22—23 of the shaft 18 and held against rotation with relation to said shaft 21 is a member embodying gears 32 and 33 adapted to coact with the gears 22 and 23 respectively. These gears 32 and 33 are connected by a spindle provided with a groove 34, the spindle being of such length that when the same is in the neutral or normal position the gears 32 and 33 are arranged upon opposite sides of the gears 22 and 23. Pivotally connected to the transverse bar 26 is a second bell crank lever 34ª provided upon one side thereof with a fork engaging the groove 34 and having its free arm connected by means of a link 35 with an operating handle 36. It will be seen that by manipulation of the handle 36 that either of the gears 32 and 33 may be brought into engagement with its corresponding gear 22 or 23, as desired.

Extending transversely of the forward extension 11 is a bar 37 having pivotally connected thereto intermediate its ends, a lever 38 having one end forked to engage the movable member of the clutch 16. The opposite end of the lever is engaged by a link 39 and this link is in turn operatively connected with the operating handle 40 arranged adjacent the driver's seat 31.

The ends of the shaft 18 project beyond the sides of the frame 10 and are each provided with a step pulley 41 embodying a small pulley 42 and a large pulley 43. These pulleys 41 likewise each embody the female member of a clutch and are mounted for rotation upon the shaft 18 and held against longitudinal displacement with relation thereto.

Slidably mounted upon the shaft 18 are the male members 44 of the clutch, said male members being feathered to the shaft 18 in the well known manner. A lever 45 is pivoted intermediate its ends to the frame 10 forwardly of the shaft 18 at each end thereof and has one end forked to engage the male member of the clutch corresponding thereto. The opposite end of the lever 45 is operatively connected to one arm of the bell crank lever 47 pivotally mounted upon the sides of the frame 11. The free arms of the bell crank lever 47 are operatively connected by links 48 and shaft 49 with an operating handle 50 by means of which the clutches of the pulley members may be thrown into and out of engagement.

The ends of the shaft 21 likewise extend beyond the sides of the frame 10 and are provided with sprocket gears 51. Each driving wheel 14 is provided with a large gear 52 secured thereto upon the inner side thereof. Mounted in the sides of the frame 10 are stub shafts 53 having rotatably mounted thereon compound members, each comprising a sprocket gear 54 and a pinion 55 which meshes with the gear 52 of its respective wheel, the sprockets 54 being connected with the sprockets 51 by means of chains 56.

It will be seen from the foregoing that from the driver's seat the clutch which controls the entire drive of the machine may be controlled, and likewise the clutches associated with the shaft 18 as well as the shifting of the gears upon the shaft 21. The pulleys 41 carried by the shaft 18 form as will hereinafter more particularly appear, a drive member for the threshing mechanism. It will therefore be seen that the threshing mechanism may be connected or disconnected while the threshing machine is being driven to move from place to place and conversely the traction mechanism may be connected for operation while the threshing mechanism is in operation, thereby eliminating the necessity of stops to make the small shifts of position.

The numeral 57 designates the separator housing within the forward end of which is rotatably mounted a shaft 58 extending transversely of the housing and which operates within the housing the usual threshing cylinder (not shown). The ends of the shaft 58 project beyond the housing and are provided upon each side of the machine with a small pulley 59 and upon the right hand side of the machine with a large pulley 60. At each side of the machine the small pulleys 59 of the shaft 58 are connected with the large pulleys 43 of the shaft 18 by belts 61.

At the forward end of the separator housing 57 a shaft 62 extends transversely therethrough and has its ends projecting therebeyond. This shaft is that which operates the usual band cutter knives of the threshing mechanism (not shown) and is connected at the left hand side of the machine by means of a suitable gear 62ª with a bundle carrier 62ᵇ. At the right hand side of the machine this shaft is provided with a pulley 63. Rearwardly of the shaft 62 is disposed a second transverse shaft 64 which operates the usual straw spreader racks (not shown), this shaft being provided upon the right hand side of the machine with a pulley 65. Rearwardly of the shaft 64 a third transverse shaft 66 extends through the housing and is provided upon the right hand side of the housing with a pulley 67 and belt 68 extending about the large pulley 60 at the right hand end of the shaft 58 and the pulleys 63, 65 and 67, suitable idlers being provided in order that the belt 68 may engage each of the pulleys with sufficient traction surface.

Arranged rearwardly of the shaft 18 adjacent the bottom of the separator housing is the usual cleaning fan 70 operated by a transverse shaft 71 having its right hand end projecting beyond the side of the separator housing and provided at the right hand end with a pulley 72 and at the left hand end with pulleys 72ª and 72ᵇ. The pulley 72 is connected by means of a cross belt 73 with the small pulley 42 upon the right hand end of the shaft 18. The pulley 72 is connected by means of a cross belt 72ᶜ with a pulley 74 secured to the right hand end of the shaft 75, which shaft extends transversely of the housing and operates the usual straw rack (not shown). The pulley 72ᵇ is connected by a belt B to a relatively large pulley P mounted upon the green auger shaft Q. The pulley 72ª is connected by a belt with the pulley 60 of the shaft 58.

Arranged at the rear end of the machine adjacent the bottom thereof is a transverse shaft 76 provided with a pulley 77. This pulley 77 is connected with a small pulley 42 of the shaft 18 by means of a cross belt 78 which passes over suitable idlers 79 in order that it may be supported sufficiently to permit its clearing the drive wheel 14. Above the shaft 76 is a transverse shaft 80 rotatably mounted in the separator housing 57 to operate the usual chaffer (not shown) and has mounted upon the left hand side thereof a pulley 81. The shaft 76 is provided with a small pulley 76ª and upon its left hand end the pulley is connected with a pulley 81 by means of a belt 83. Upon the right hand side of the machine the shaft 76 which operates the usual stacker blower is provided with a pulley 82. Arranged transversely of the lower side of the separator housing is a transverse shaft 84 disposed forwardly of the transverse shaft 76 and provided with a small pulley 85. The shaft 84 operates the usual tailing blower fan, the casing of which is indicated in the drawings and the pulley 85 thereof is connected with the pulley 82 by means of a belt 86.

It will be seen from the foregoing that from the pulleys 42 and 43 upon opposite sides of the separator housing the threshing mechanism is driven, and it will likewise be seen that the heaviest driving portion of this mechanism, that portion including the bundle loader, band cutter and threshing cylinder, straw spreader and header is provided with a double drive being driven by a belt connecting this mechanism with the large pulley of the shaft 18 upon each side of the machine. It will be understood that while the threshing mechanism is being operated the threshing machine as a whole may be shifted from point to point without checking the operation of the threshing mechanism and may be suitably positioned, as direction of the mechanism is entirely under control of the operator through the medium of the steering wheel 87.

What I claim is:—

In combination with a machine frame having a forward axle provided with supporting wheels and a rear axle provided with traction wheels, an engine mounted on the forward end of the frame and having a horizontal sectional and rearwardly projecting longitudinal drive shaft, a horizontal cylinder shaft arranged transversely of the frame above the engine and having a pair of driving pulleys secured on the ends thereof at the sides of the machine, a transverse driven shaft journaled in the frame rearwardly of and adjacent to the rear end of said drive shaft and extending beyond the sides of the frame, constantly operative driving connections between the rear end of said drive shaft and the adjacent portion of said transverse driven shaft, loose pulleys on the ends of said transverse driven shaft belted to the driving pulleys of the cylinder shaft, means operable to connect said loose pulleys to the transverse driven shaft at will, a manually operable clutch between the sections of the drive shaft, a second transverse driven shaft journaled in the frame rearwardly of and adjacent to the first named transverse driven shaft and extending beyond the sides of the frame, constantly operative driving connections between the ends of the second transverse driven shaft and said traction wheels, and manually controllable speed change and reversing gearing between said first and second transverse driven shafts.

In testimony whereof I hereunto affix my signature.

ALMA COMO.